United States Patent
Okuda et al.

(10) Patent No.: US 9,337,770 B2
(45) Date of Patent: May 10, 2016

(54) SOLAR CELL MODULE

(71) Applicant: SANYO Electric Co., Ltd., Osaka (JP)

(72) Inventors: Yuki Okuda, Osaka (JP); Akihisa Nakahashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/656,771

(22) Filed: Mar. 13, 2015

(65) Prior Publication Data

US 2015/0188485 A1 Jul. 2, 2015

Related U.S. Application Data

(63) Continuation of application No. PCT/JP2013/075657, filed on Sep. 24, 2013.

(30) Foreign Application Priority Data

Sep. 28, 2012 (JP) .................................. 2012-215771

(51) Int. Cl.
*H02S 20/00* (2014.01)
*H01L 31/042* (2014.01)
*H02S 30/10* (2014.01)
*F24J 2/46* (2006.01)
*F24J 2/52* (2006.01)

(52) U.S. Cl.
CPC ............... *H02S 30/10* (2014.12); *F24J 2/4614* (2013.01); *F24J 2/5211* (2013.01)

(58) Field of Classification Search
CPC ........ H02S 30/10; F24J 2/4614; F24J 2/5211; F24J 2002/5213; F24J 2002/5215
See application file for complete search history.

(56) References Cited

U.S. PATENT DOCUMENTS

| | | | | |
|---|---|---|---|---|
| 7,956,279 | B2 * | 6/2011 | Morita | F24J 2/4614 136/244 |
| 8,272,189 | B2 * | 9/2012 | Chan | F24J 2/5211 52/173.3 |
| 8,297,009 | B2 * | 10/2012 | Yamamoto | H02S 30/10 136/251 |
| 8,404,966 | B2 * | 3/2013 | Nakamura | H02S 20/00 136/251 |
| 8,418,416 | B2 * | 4/2013 | Hirayama | F24J 2/5211 136/251 |
| 8,479,458 | B2 * | 7/2013 | Morita | F24J 2/4614 136/251 |
| 8,572,906 | B2 * | 11/2013 | Nakamura | F24J 2/5211 136/251 |

(Continued)

FOREIGN PATENT DOCUMENTS

| JP | 2000243998 A | * | 9/2000 |
|---|---|---|---|
| JP | 2005-294455 A | | 10/2005 |

(Continued)

*Primary Examiner* — Robert Canfield
(74) *Attorney, Agent, or Firm* — Mots Law, PLLC

(57) ABSTRACT

A long-side frame piece has a cylindrical portion. The cylindrical portion is formed from one side end along the direction in which the long-side frame piece extends to the other side end. The cylindrical portion has threaded holes. The threaded holes are provided inside a through hole. Screws are inserted in the threaded holes. A short-side frame piece has a plate-shaped portion. The plate-shaped portion covers the end of the cylindrical portion in the direction in which the long-side frame piece extends. Openings are formed in the plate-shaped portion, through which pass the screws inserted in the threaded holes. The plate-shaped portion has a cutout exposing a portion of the module body from a first surface toward a second surface, formed closer to a first direction side than the threaded holes of the through hole.

3 Claims, 6 Drawing Sheets

(56) References Cited

U.S. PATENT DOCUMENTS

| | | | | |
|---|---|---|---|---|
| 8,607,511 B2* | 12/2013 | Hirayama | F24J 2/4614 | 52/173.3 |
| 8,806,816 B2* | 8/2014 | Brodam | F24J 2/4614 | 52/177 |
| 2010/0218810 A1* | 9/2010 | Suganuma | H02S 20/00 | 136/251 |
| 2010/0243035 A1* | 9/2010 | Nakamura | F24J 2/5211 | 136/251 |
| 2010/0288338 A1* | 11/2010 | Yamamoto | F24J 2/4614 | 136/251 |
| 2011/0088781 A1* | 4/2011 | Yamamoto | H02S 30/10 | 136/259 |
| 2011/0108093 A1* | 5/2011 | Hessler | F24J 2/5211 | 136/251 |
| 2011/0155127 A1* | 6/2011 | Li | F24J 2/5211 | 126/704 |
| 2011/0253201 A1* | 10/2011 | Morita | F24J 2/4614 | 136/251 |
| 2012/0024350 A1* | 2/2012 | Chan | H02S 30/10 | 136/251 |
| 2012/0233840 A1* | 9/2012 | Motoyama | F24J 2/4614 | 29/428 |
| 2012/0234379 A1* | 9/2012 | Takenaka | F24J 2/4614 | 136/251 |
| 2012/0285535 A1* | 11/2012 | Tago | H02S 30/10 | 136/259 |
| 2013/0213458 A1* | 8/2013 | Tsujimoto | H01L 31/0424 | 136/251 |
| 2015/0122332 A1* | 5/2015 | Suzuki | H02S 20/00 | 136/259 |
| 2015/0222219 A1* | 8/2015 | Kouyanagi | H01L 31/042 | 136/251 |
| 2015/0249425 A1* | 9/2015 | Fukumochi | H02S 30/10 | 136/251 |
| 2015/0256125 A1* | 9/2015 | Kouyanagi | F24J 2/4614 | 136/251 |

FOREIGN PATENT DOCUMENTS

| | | | |
|---|---|---|---|
| JP | 2011-035255 | * | 2/2011 |
| JP | 2011114257 A | * | 6/2011 |
| JP | 2011254109 A | * | 12/2011 |

* cited by examiner

SOLAR CELL MODULE

CROSS REFERENCE TO RELATED APPLICATIONS

This application is a continuation application of International Application No. PCT/JP2013/075657, filed on Sep. 24, 2013, entitled "SOLAR CELL MODULE", which claims priority based on the Article 8 of Patent Cooperation Treaty from prior Japanese Patent Application No. 2012-215771, filed on Sep. 28, 2012, the entire contents of which are incorporated herein by reference.

TECHNICAL FIELD

The disclosure relates to a solar cell module.

BACKGROUND ART

As an environment-friendly energy source, solar cell modules have attracted increasing attention in recent years.

A solar cell module includes: a module body including solar cells; and a frame provided around the module body. In a usual practice, the frame is formed by connecting four frame pieces, which are provided on the sides of the module body. Japanese Patent Application Publication No. 2005-294455 (Patent Document 1) discloses frames that are connected together by screws.

SUMMARY

One problem in the art has been that if water stays inside the frame of a solar panel, the frame is likely to break due to expansion of water that freezes as the temperature of the atmosphere of the solar cell module falls. For this reason, the solar cell module needs to be designed to facilitate discharge of water inside the frame.

However, in reality, for the solar cell module equipped with the frame including the screwed frame pieces, study has been made on a solar cell module, which facilitates discharge of water from inside a frame.

A solar cell module according to an embodiment described herein that alleviates the problem includes a rectangular module body and a frame. The module body includes a first surface and a second surface on an opposite side from the first surface. The module body includes a solar cell. The frame is provided surrounding the module body. The frame includes a long-side frame piece, a short-side frame piece, and a fixation screw. The long-side frame piece is provided outside a long side part of the module body. The short-side frame piece is provided outside a short side part of the module body. The screw fixes the long-side frame piece and the short-side frame piece to each other. The long-side frame piece includes a cylindrical part in which a through hole is formed from one end portion to an opposite end portion thereof in an extending direction of the long-side frame piece. The cylindrical part includes a screw hole provided inside the through hole, and the screw is inserted into the screw hole. The short-side frame piece includes a plate-shaped part configured to cover an end portion of the cylindrical part in the extending direction of the long-side frame piece, and an opening is formed in the plate-shaped part. The screw penetrates the opening when inserted into the screw hole. A cutout is formed in the plate-shaped part. The cutout exposes a portion of the through hole on a first direction side outside the screw hole in a first direction pointing from the first surface to the second surface of the module body. This structure provided great benefit of alleviating the freezing problem.

DETAILED DESCRIPTION

Figure 1:
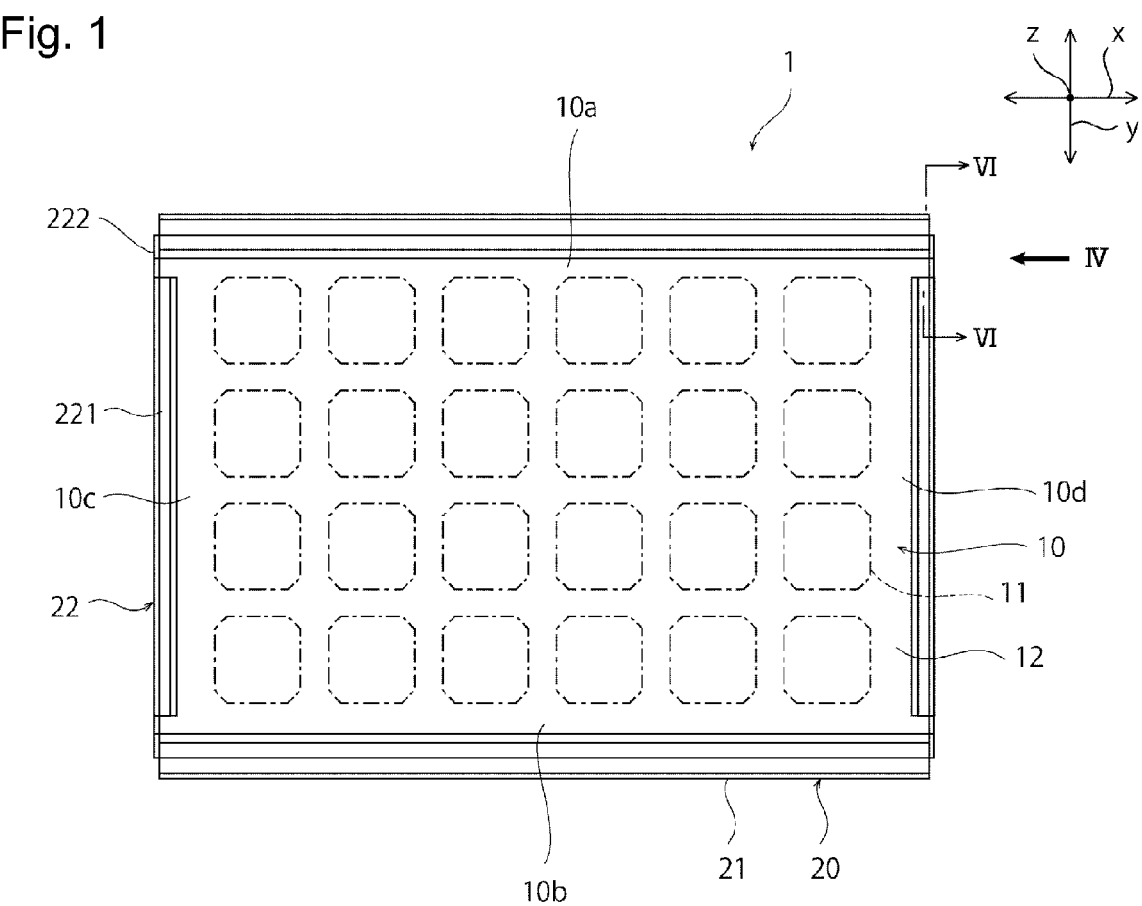
FIG. 1 is a schematic plan view of a solar cell module of an embodiment.

Descriptions are hereinbelow provided for an example of a preferred embodiment. The following embodiment is shown just as an example and does not limit the claimed invention.

In the drawings to which the embodiment and the like refer, members playing virtually the same functions are denoted by the same reference numerals. The drawings to which the embodiment and the like refer are schematic representations. Dimensional ratios of objects depicted in the drawings may differ from those of the actual objects. The dimensional ratios of the objects may differ from one drawing to another as well. Concrete dimensional ratios of the objects need to be determined with the following descriptions taken into consideration.

Figure 2:
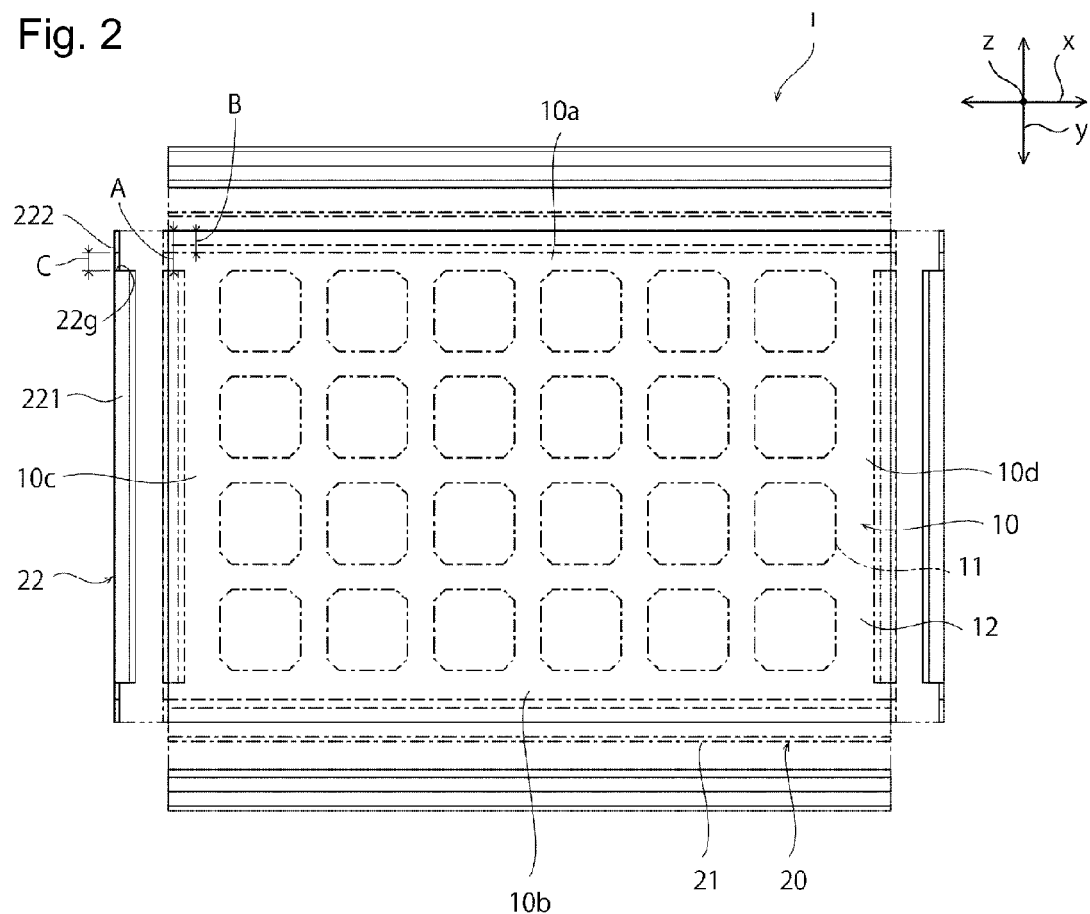
FIG. 2 is a diagram of module body 10 and frame 20 separated from the solar cell module of the embodiment.

FIG. 1 is a schematic plan view of a solar cell module of an embodiment. FIG. 2 is a diagram of module body 10 and frame 20 separated from solar cell module 1 illustrated in FIG. 1. In FIG. 2, dotted lines on module body 10 represent a location in which to place frame 20.

As illustrated in FIGS. 1 and 2, solar cell module 1 includes module body 10 and frame 20.

Module body 10 is shaped like a rectangle, when viewed in a z-axis direction. Module body 10 includes first and second long side parts 10a, 10b, and first and second short side parts 10c, 10d. First and second long side parts 10a, 10b are parallel to each other, and extend in an x-axis direction. First and second short side parts 10c, 10d are parallel to each other, and extend in a y-axis direction.

Module body 10 includes solar cells 11. To put it concretely, module body 10 includes solar cells 11 which are electrically connected with wiring members (not illustrated). First protection member 12 is disposed on the light reception surfaces of solar cells 11. A second protection member is disposed on the back surfaces of solar cells 11. A sealing member is provided between first protection member 12 and the second protection member. The sealing member seals solar cells 11.

It should be noted that first protection member 12 may be made from a glass plate, a ceramic plate, a resin plate, or the like, for example. Second protection member may be made from a glass plate, a ceramic plate, a resin plate, a resin sheet, a resin sheet including a metal layer, or the like. The sealing member may be made of crosslinked resin such as ethylene vinyl acetate copolymers (EVA), or non-crosslinked resin such as polyolefin, for example.

Metal-made frame 20 surrounds the outer peripheries of module body 10. The end portions of module body 10 are fitted into frame 20. Frame 20 includes: a pair of long-side frame pieces 21 provided outside first and second long side parts 10a, 10b, respectively; and a pair of short-side frame pieces 22 provided outside first and second short side parts 10c, 10d, respectively.

Long-side frame pieces 21 are provided extending from one-side end portions to opposite-side end portions of long side parts 10a, 10b in the x-axis direction, respectively. Short-side frame pieces 22 include support parts 221 and fixation parts 222, respectively. Support parts 221 are provided extending from positions short of one-side end portions of short side parts 10c, 10d by length A to positions short of opposite-side end portions of short side parts 10c, 10d by length A in the x-axis direction, respectively. Fixation parts 222 extend from support parts 221 in the y-axis direction in a way that fixation parts 222 cover end portions of long-side frame pieces 21 in the x-axis direction, respectively. It should be noted that as illustrated in FIG. 2, length A is a total of: length B of long-side frame piece 21 in the y-axis direction by which long-side frame piece 21 is fitted into module body 10; and length C of cutout 22g, which is described later.

Figure 3:
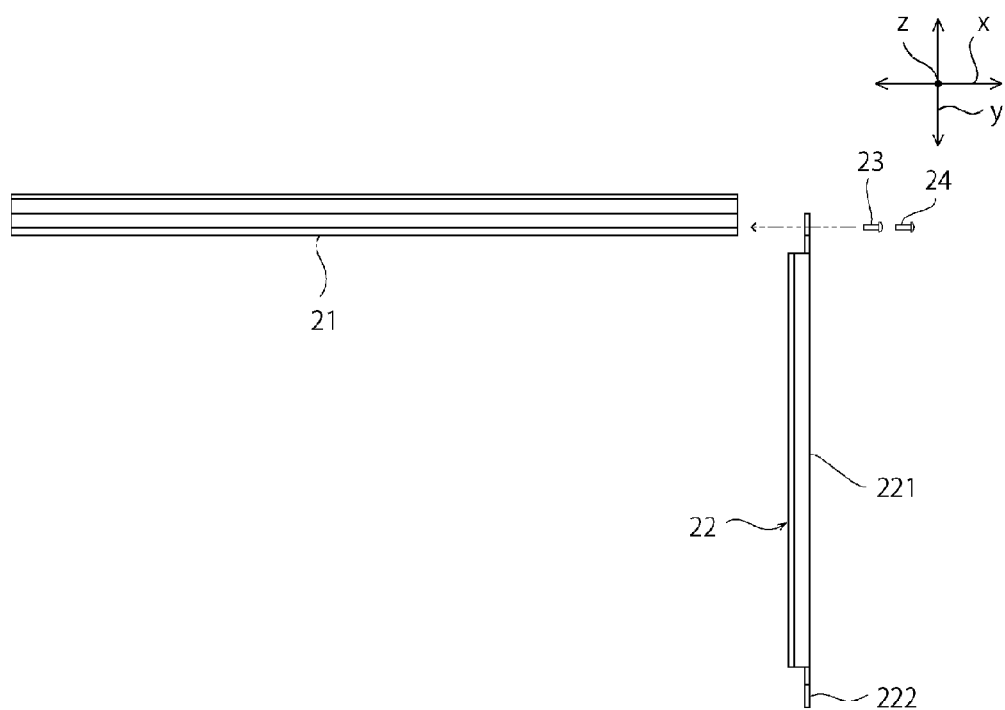
FIG. 3 is a diagram of showing how a long-side frame piece and a short-side frame piece of the embodiment are connected together.

FIG. 3 is a diagram showing how long-side frame piece 21 and short-side frame piece 22 are connected together. As illustrated in FIG. 3, long-side frame piece 21 and fixation part 222 of neighboring short-side frame piece 22 are fixed to each other with first and second screws 23, 24 attached from short-side frame piece 22 to long-side frame piece 21.

Figure 4:
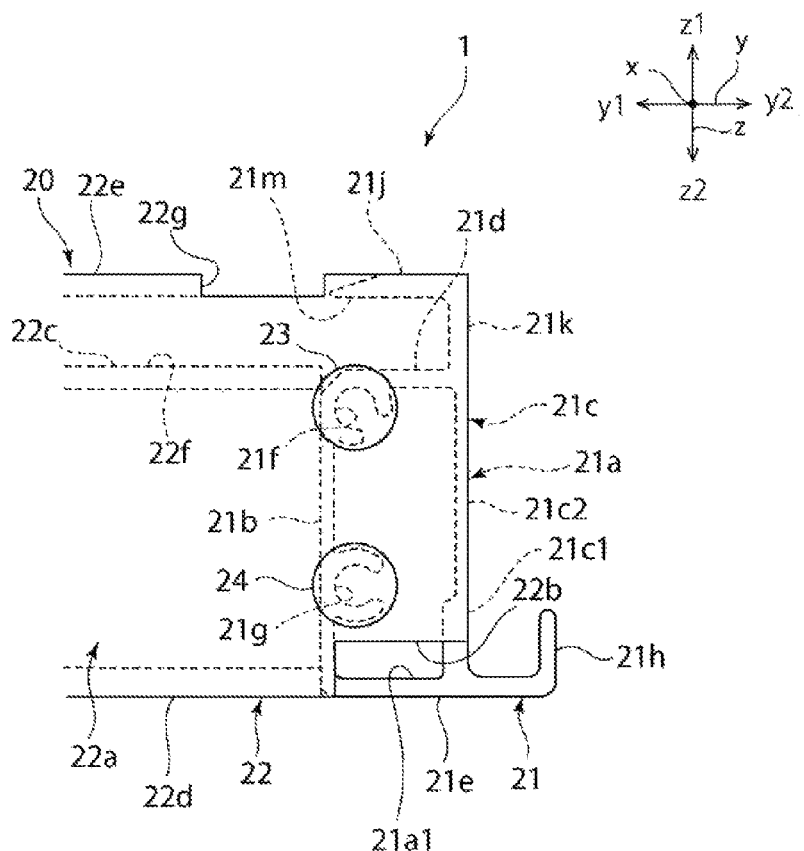
FIG. 4 is a schematic side view of the solar cell module viewed in an arrow IV direction of FIG. 1.
Figure 5:
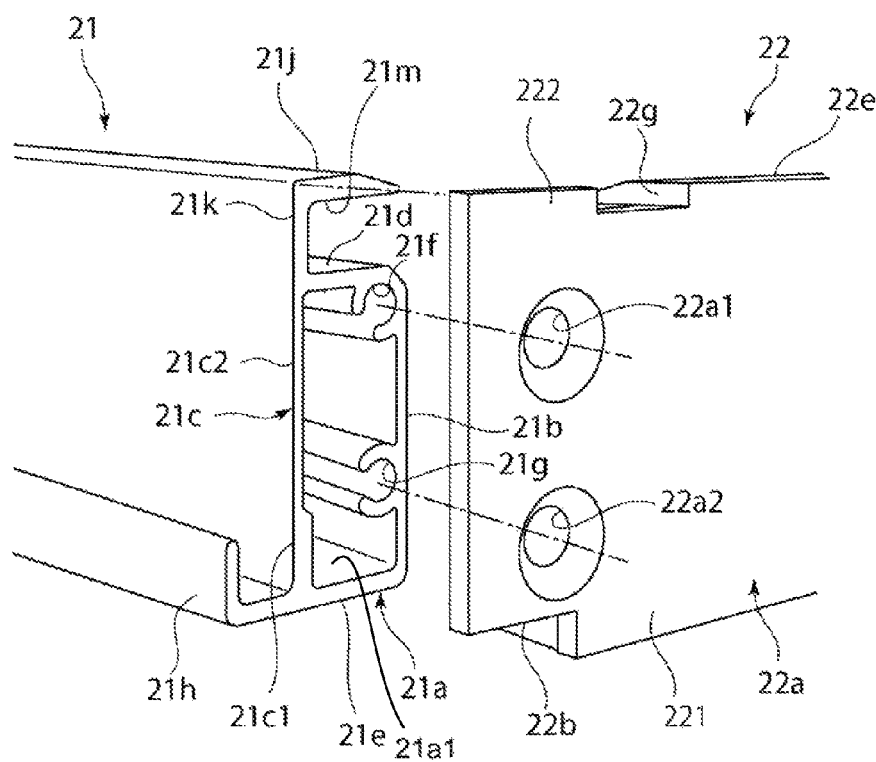
FIG. 5 is a schematic exploded perspective view of a frame of the embodiment.
Figure 6:
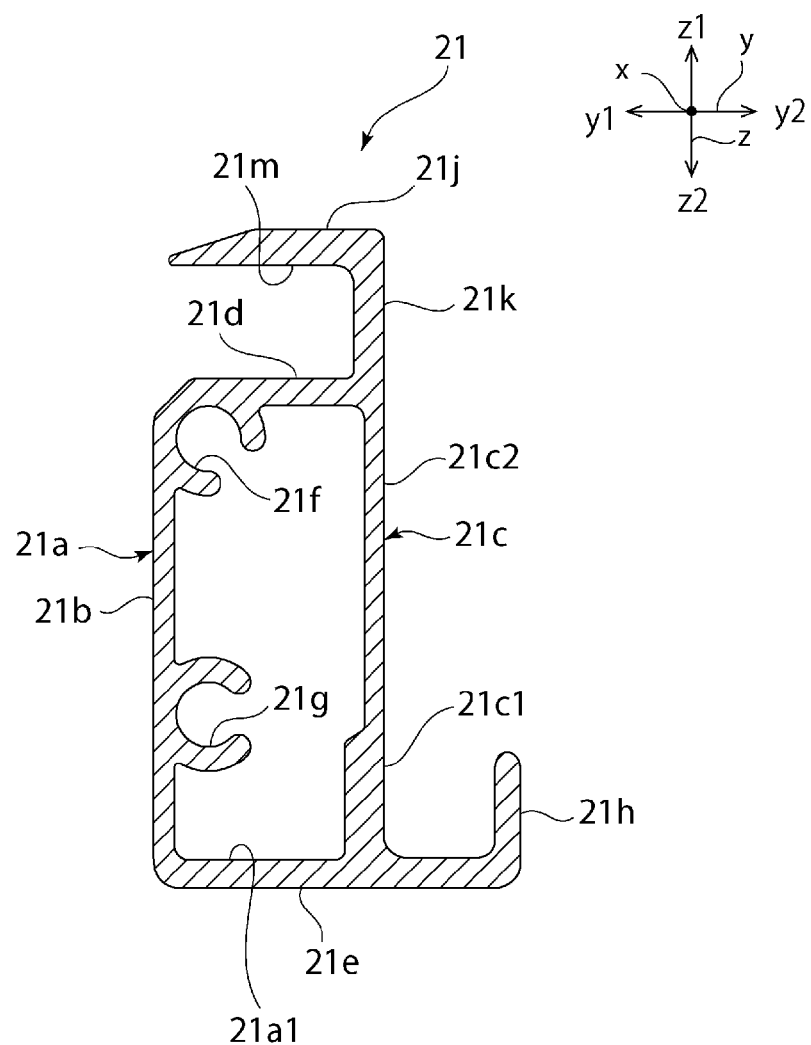
FIG. 6 is a schematic cross-sectional view of the long-side frame piece taken along the VI-VI line of FIG. 1.

To begin with, descriptions are provided for the configuration of long-side frame piece 21. FIG. 4 is a schematic side view of the solar cell module viewed in an arrow IV direction of FIG. 1. Part of the end portion of long-side frame piece 21 in the x-axis direction is covered with fixation part 222 of short-side frame piece 22. In FIG. 4, the part covered with fixation part 222 of long-side frame piece 21, and module body 10-side part of short-side frame piece 22 are indicated with broken lines for the purpose of explaining the structure. FIG. 5 is a schematic exploded perspective view of the frame of an embodiment. FIG. 6 is a schematic cross-sectional view of the long-side frame piece taken along the VI-VI line of FIG. 1.

As illustrated in FIGS. 4 to 6, long-side frame piece 21 includes cylindrical part 21a, extension part 21h and groove 21m. Cylindrical part 21a, extension part 21h and groove 21m are formed extending from the one-side to opposite-side end portions of long-side frame piece 21 in the x-axis direction.

Cylindrical part 21a includes inner sidewall part 21b, outer sidewall part 21c, ceiling wall part 21d and bottom wall part 21e.

Inner sidewall part 21b extends in the z-axis direction, and is located along a module body 10-side portion of cylindrical part 21a, or along a y1-side portion of cylindrical part 21a in the y-axis direction. Outer sidewall part 21c extends in parallel with inner sidewall part 21b, and is located along an opposite portion of cylindrical part 21a from module body 10, or along a y2-side portion of cylindrical part 21a in the y-axis direction. Ceiling wall part 21d extends in the y-axis direction, and connects a z1-side end portion of inner sidewall part 21b in the z-axis direction and a z1-side end portion of outer sidewall part 21c in the z-axis direction. Bottom wall part 21e extends in the y-axis direction, and connects a z2-side end portion of inner sidewall part 21b in the z-axis direction and a z2-side end portion of outer sidewall part 21c in the z-axis direction.

Through hole 21a1 is formed by inner sidewall part 21b, outer sidewall part 21c, ceiling wall part 21d and bottom wall part 21e. Through hole 21a1 is formed extending from one-side to opposite-side end portions of long-side frame piece 21 in the x-axis direction. The cross section of through hole 21a1 on a plane defined by the y- and z-axes is shaped like a rectangle.

First screw hole 21f into which to insert first screw 23, and second screw hole 21g into which to insert second screw 24 are provided inside cylindrical part 21a. First and second screw holes 21f, 21g extend in the x-axis direction. First screw hole 21f is disposed at a position at which inner sidewall part 21b and ceiling wall part 21d intersect each other. Second screw hole 21g is disposed on inner sidewall part 21b, and on the z2 side of first screw hole 21f. In other words, first and second screw holes 21f, 21g are adjacently provided on the inner sidewall part 21b.

It should be noted that: first and second screw holes 21f, 21g are each shaped like a cylinder, which extends in the x-axis direction, and the side surface of which is partially opened. The opening directions of first and second screw holes 21f, 21g are different from each other. In this respect, first screw hole 21f is opened in a direction between the y2 and z2 directions. Second screw hole 21g is opened in the y2 direction. Since the side surface of each screw hole is opened like this, it is possible to secure play for the alignment of the screw hole and the corresponding screw with each other. Furthermore, since the opening directions of the two screw holes are different from each other, the two screw holes are durable against contractions and stretches in different directions.

Extension part 21h is provided, projecting in the y2 direction from a z2-side end portion of a y2-side wall surface of outer sidewall part 21c. The cross section of extension part 21h on a plane defined by the y- and z-axes is shaped like the letter L. Solar cell module 1 is fixed to a setting surface with the assistance of extension part 21h.

Furthermore, outer sidewall part 21c is formed in a way that its z2-side portion 21c1 is thicker in wall thickness, or in y-direction thickness, than its z1-side portion 21c2. This enhances the rigidity of frame 20.

Groove 21m is formed by flange part 21j, ceiling wall part 21d of cylindrical part 21a, and connection part 21k. Flange part 21j extends in the y-axis direction, and is disposed away from ceiling wall part 21d of cylindrical part 21a by a distance in a z1 direction. Connection part 21k connects a y2-side end portion of flange part 21j and a y2-side portion of ceiling wall part 21d. A z2-side portion of connection part 21k is connected to the z1-side end portion of outer sidewall part 21c of cylindrical part 21a. Groove 21m is formed by flange part 21j, ceiling wall part 21d and connection part 21k, as well as is shaped like the letter U, which is opened in the y1 direction. First and second long side parts 10a, 10b of module body 10 are fitted into grooves 21m, respectively.

Figure 7:
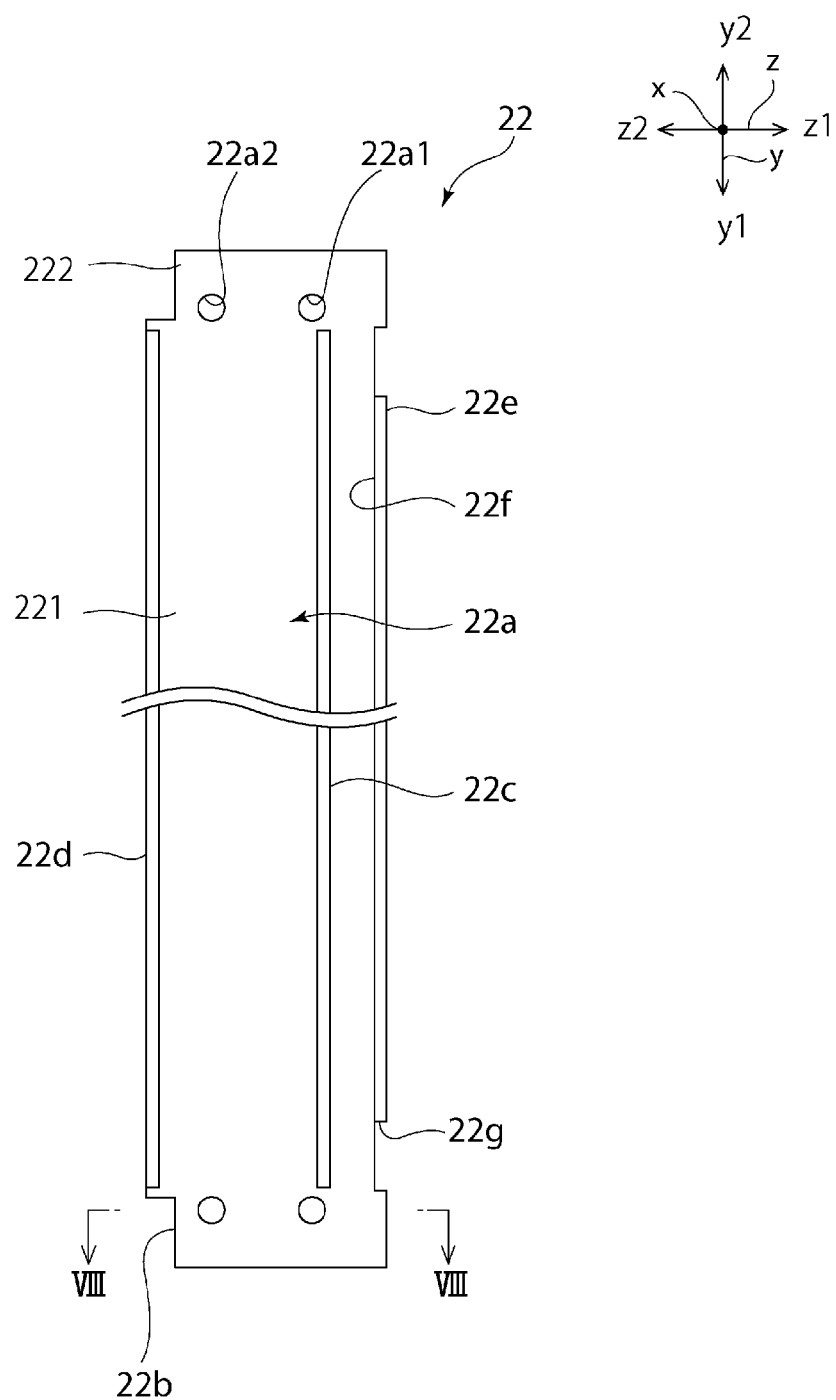
FIG. 7 is a schematic side view of the short-side frame piece of the embodiment.
Figure 8:
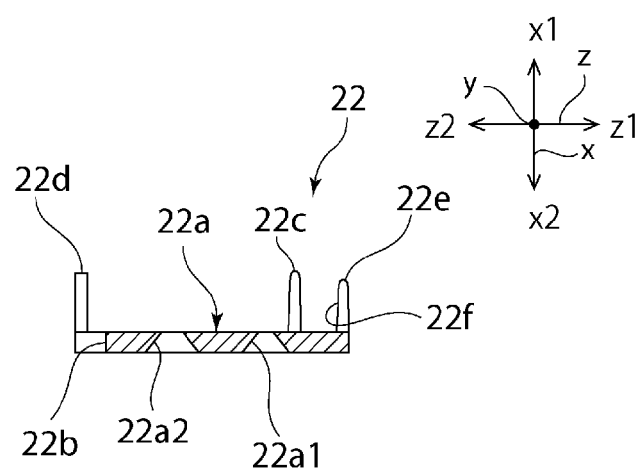
FIG. 8 is a schematic cross-sectional view of the short-side frame piece taken along the VIII-VIII line of FIG. 7.

Next, descriptions are provided for a configuration of short-side frame piece 22. FIG. 7 is a schematic side view of the short-side frame piece of an embodiment. FIG. 8 is a schematic cross-sectional view of the short-side frame piece taken along the VIII-VIII line of FIG. 7.

As illustrated in FIGS. 4, 5, 7 and 8, short-side frame piece 22 is formed from plate-shaped part 22a. Fixation parts 222, described above, are the two end portions of plate-shaped part 22a in the y-axis direction. Openings 22a1, 22a2, cutouts 22*b*, first and second ribs 22*c*, 22*d*, groove 22*f*, and cutouts 22*g* are formed in plate-shaped part 22*a*.

Openings 22*a*1, 22*a*2 are through holes formed in places short of the two end portions of plate-shaped part 22*a* in the y-axis direction by a predetermined distance. First and second screws 23, 24 are placed in openings 22*a*1, 22*a*2. First screws 23 penetrate openings 22*a*1, and are inserted into first screw holes 21*f*. Second screws 24 penetrate openings 22*a*2, and are inserted into second screw holes 21*g*. Thereby, mutually adjacent long-side and short-side frame pieces 21, 22 are fixed to each other.

In long-side frame piece 21, as described above, first and second screw holes 21*f*, 21*g* are adjacently provided on the inner sidewall part 21*b* of cylindrical part 21*a*. For this reason, openings 22*a*1, 22*a*2 can be provided in places away from the two side end portions of plate-shaped part 22*a* in the y-axis direction. This inhibits a decrease in the rigidity of the portions of plate-shaped part 22*a*, which are provided with openings 22*a*1, 22*a*2, compared with a case where openings 22*a*1, 22*a*2 are formed near the end portions of plate-shaped part 22*a* in the y-axis direction.

As illustrated in FIGS. 4 and 5, cutout 22*b* is formed where z2- and y2-side sides of plate-shaped part 22*a* intersect each other. The size of cutouts 22*b* is adjusted such that, when short-side frame piece 22 is attached to long-side frame piece 21, screw holes 21*f*, 21*g* in through hole 21*a*1 are not exposed through cutout 22*b*. Because of cutout 22*b*, water that once enters through hole 21*a*1 is preferably discharged from through hole 21*a*1 via cutout 22*b*. Cutout 22*b* is provided in each corner portion of solar cell module 1. This makes it easy to discharge water from through hole 21*a*1.

As illustrated in FIGS. 4, 7 and 8, first and second ribs 22*c*, 22*d* extend in parallel in the y-axis direction, and jut out in an x1 direction from an x1-side wall surface of plate-shaped part 22*a*. In other words, first and second ribs 22*c*, 22*d* jut out from a module body 10-facing surface of plate-shaped part 22*a* toward module body 10. First and second ribs 22*c*, 22*d* are provided across plate-shaped part 22*a* in the y-axis direction, except for the end portions provided with openings 22*a*1, 22*a*2. Second rib 22*d* is formed in a z2-side end portion of plate-shaped part 22*a*. First rib 22*c* is formed on the Z1 side of second rib 22*d*. First and second ribs 22*c*, 22*d* enhance the rigidity of plate-shaped part 22*a*.

Groove 22*f* is formed by part of plate-shaped part 22*a*, first rib 22*c*, and flange part 22*e*. Flange part 22*e* extends along a z1-side end portion of plate-shaped part 22*a* in the y-axis direction. The length of flange part 22*e* in the y-axis direction is less than the length of first and second ribs 22*c*, 22*d* in the y-axis direction. Flange part 22*e* juts out in the x1 direction from the x1-side wall surface of plate-shaped part 22*a*. Groove 22*f* is formed by flange part 22*e*, plate-shaped part 22*a* and rib 22*c*, as well and is shaped like the letter U, which is opened in the x1 direction. First and second short side parts 10*c*, 10*d* of module body 10 are fitted into grooves 22*f*, respectively. Groove 22*f* corresponds to aforementioned support part 221 of short-side frame piece 22.

In the z1-side end portion of plate-shaped part 22*a*, as illustrated in FIGS. 4, 5 and 7, cutouts 22*g* are formed between the two end portions of flange part 22*e* in the y-axis direction and the portions of plate-shaped part 22*a* which cover long-side frame pieces 21, respectively. Cutouts 22*g* are formed in fixation parts 222 of short-side frame piece 22, respectively. Cutouts 22*g* are each shaped like a recess. The base of the recess of each cutout 22*g* is flush with a light reception surface-side surface of module body 10, or is situated at a level shifted from the light reception surface-side surface of module body 10 and even reaching the back surface of module body 10. Thereby, water on module body 10 is preferably discharged via cutout 22*g*. Particularly since cutouts 22*g* are provided in all the corner portions of module body 10, water on module body 10 is preferably discharged via cutouts 22*g*.

In the case of solar cell module 1 in which frame pieces 21, 22 are produced by an extrusion formation method, cutouts 22*b*, 22*g* and openings 22*a*1, 22*a*2, which need to be processed by the extrusion formation method, are all included in short-side frame piece 22. For this reason, long-side frame piece 21 can be formed by only a limited process, namely, end-surface cutting. This makes it easy to produce frame 20, and makes it possible to produce frame 20 economically.

Furthermore, cylindrical part 21*a* is provided to long-side frame piece 21. This enhances the rigidity of long-side frame piece 21, which is relatively long and needs a higher rigidity. In contrast, no cylindrical part is provided to short-side frame piece 22. This is because short-side frame piece 22 is relatively short and needs no higher rigidity. Accordingly, it is only inside long-side frame piece 21 including cylindrical part 21*a* that water is likely to stay, while water is unlikely to stay inside short-side frame piece 22. Water which stays inside long-side frame pieces 21 is preferably discharged via cutouts 22*b* formed in the corners of frame 20.

In addition, the extending direction of flange part 21*j* and the extending direction of extension part 21*h* are different from each other on a cross section (a y-z plane) perpendicular to the longitudinal direction of long-side frame piece 21. This enhances the rigidity of long-side frame piece 21 more.

Furthermore, inside cylindrical part 21*a* (through hole 21*a*1), first screw hole 21*f* is disposed at the position at which inner sidewall part 21*b* and ceiling wall part 21*d* intersect each other. Second screw hole 21*g* is provided on inner sidewall part 21*b*, on the z2 side of first screw hole 21*f*, and on the z1 side of the z2-side end portion of the inner sidewall part 21*b*. This enhances the strength of long-side frame piece 21. Moreover, because no screw hole is provided in a z2-side end portion of through hole 21*a*1, it is easy to drain water.

In this way, embodiments above provide solar cell modules, which facilitate discharge of water from inside a frame.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:
1. A solar cell module comprising:
a rectangular module body including a first surface and a second surface on an opposite side from the first surface, and including a solar cell; and
a frame provided surrounding the module body, wherein the frame includes
a long-side frame piece provided outside a long side part of the module body,
a short-side frame piece provided outside a short side part of the module body, and
a screw configured to fix the long-side frame piece and the short-side frame piece to each other,
the long-side frame piece includes a tubular portion in which a through hole is formed from one end portion to an opposite end portion thereof in an extending direction of the long-side frame piece, the tubular portion includes a screw hole provided inside the through hole and configured to allow the screw to be inserted therein, the short-side frame piece includes a plate-shaped portion that covers an end portion of the tubular portion in the extending direction of the long-side frame piece, an opening formed in the plate-shaped portion, the screw penetrating the opening when inserted in the screw hole, and a cutout is formed in the plate-shaped portion, the cutout configured to expose a portion of the through hole on a first direction side outside the screw hole in a first direction pointing from the first surface to the second surface of the module body, wherein the long-side frame piece further includes an extension portion that, on a cross-section of the long-side frame piece perpendicular to the extending direction of the long-side frame piece, extends in a direction opposite to the module body from an end portion of a sidewall portion of the tubular portion on the first direction side, the sidewall part being situated on an opposite side of the tubular portion from the module body, and the sidewall portion is formed to have a wall thickness thicker at its portion on the first direction side than at its portion on a second direction side.

2. The solar cell module according to claim 1, wherein the short-side frame piece further includes a rib provided on a surface of the plate-shaped portion that faces the module body, and extending in an extending direction of the short-side frame piece.

3. The solar cell module according to claim 1, wherein the short-side frame piece includes a recess-shaped cutout in an end portion of the short-side frame piece on a second direction side opposite to the first direction side, and a base of the cutout is flush with the first surface of the module body, or situated at a level shifted from the first surface of the module body toward the first direction side.

* * * * *